United States Patent
Zhao et al.

(10) Patent No.: US 10,027,686 B2
(45) Date of Patent: Jul. 17, 2018

(54) PARAMETER ADJUSTMENT FOR PATTERN DISCOVERY

(75) Inventors: Zhipeng Zhao, Sunnyvale, CA (US); Yanlin Wang, San Jose, CA (US); Anurag Singla, Cupertino, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 143 days.

(21) Appl. No.: 14/398,017

(22) PCT Filed: May 30, 2012

(86) PCT No.: PCT/US2012/040022
§ 371 (c)(1),
(2), (4) Date: Oct. 30, 2014

(87) PCT Pub. No.: WO2013/180708
PCT Pub. Date: Dec. 5, 2013

(65) Prior Publication Data
US 2015/0106922 A1    Apr. 16, 2015

(51) Int. Cl.
*G06F 11/00* (2006.01)
*H04L 29/06* (2006.01)
*H04L 12/26* (2006.01)
*G06F 12/14* (2006.01)

(52) U.S. Cl.
CPC .......... *H04L 63/1408* (2013.01); *H04L 43/04* (2013.01)

(58) Field of Classification Search
CPC ........ G06F 17/00; G06F 21/00; G06F 21/575; G06F 21/07; G06F 2221/034; G06F 9/4401; H04L 43/04; H04L 63/1408; H04L 63/00; H04L 2209/127

USPC .......................................................... 726/22
See application file for complete search history.

(56) References Cited

U.S. PATENT DOCUMENTS

| | | | | |
|---|---|---|---|---|
| 6,091,712 A * | 7/2000 | Pope | ................. | H04M 3/2254 370/244 |
| 7,664,048 B1 * | 2/2010 | Yung | .................... | H04L 41/28 370/235 |
| 7,934,257 B1 | 4/2011 | Kienzle et al. | | |
| 8,046,835 B2 * | 10/2011 | Herz | ................... | G06Q 20/201 726/25 |
| 8,099,452 B2 * | 1/2012 | Chkodrov | ............... | G06F 1/12 709/201 |
| 8,457,928 B2 * | 6/2013 | Dang | ................ | G06F 11/3409 702/186 |

(Continued)

FOREIGN PATENT DOCUMENTS

CN    102456062    5/2012

OTHER PUBLICATIONS

International Search Report and Written Opinon received in PCT Application No. PCT/US2012/040022, dated Feb. 26, 2013, 10 pages.

(Continued)

*Primary Examiner* — Gary S Gracia

(57) ABSTRACT

Pattern discovery performed on event data may include selecting an initial set of parameters for the pattern discovery. The parameters may specify conditions for identifying a pattern in the event data. A pattern discovery run is executed on the event data based on the initial set of parameters, and a parameter may be adjusted based on the output of the pattern discovery run.

18 Claims, 5 Drawing Sheets

(56) References Cited

U.S. PATENT DOCUMENTS

| | | | |
|---|---|---|---|
| 8,572,733 B1 * | 10/2013 | Rockwood | H04L 63/1433 709/224 |
| 8,584,128 B1 * | 11/2013 | Don | G06F 9/5011 718/100 |
| 8,676,841 B2 * | 3/2014 | Srinivasan | G06K 9/62 707/780 |
| 8,838,764 B1 * | 9/2014 | Johnston | H04L 41/0866 709/223 |
| 2004/0128267 A1 | 7/2004 | Berger et al. | |
| 2005/0251860 A1 * | 11/2005 | Saurabh | G06F 21/552 726/23 |
| 2006/0053490 A1 * | 3/2006 | Herz | H04L 63/1441 726/23 |
| 2006/0070127 A1 * | 3/2006 | Friedlander | G06F 19/324 726/22 |
| 2006/0253725 A1 * | 11/2006 | Chen | G06F 11/2025 714/47.1 |
| 2007/0081508 A1 | 4/2007 | Madhavan | |
| 2007/0094491 A1 | 4/2007 | Teo et al. | |
| 2007/0300301 A1 * | 12/2007 | Cangini | G06F 21/552 726/23 |
| 2008/0155651 A1 * | 6/2008 | Wasmund | G06F 21/316 726/2 |
| 2008/0301765 A1 * | 12/2008 | Nicol | H04L 41/142 726/1 |
| 2009/0052372 A1 * | 2/2009 | Durazzo | H04W 52/225 370/318 |
| 2009/0064333 A1 * | 3/2009 | Saurabh | G06F 21/552 726/23 |
| 2009/0300166 A1 | 12/2009 | Chen et al. | |
| 2010/0057663 A1 | 3/2010 | Srinivasan | |
| 2010/0057727 A1 * | 3/2010 | Srinivasan | G06K 9/62 707/E17.017 |
| 2010/0128736 A1 * | 5/2010 | Shiraki | H04L 63/0227 370/412 |
| 2010/0257580 A1 * | 10/2010 | Zhao | H04L 43/00 726/1 |
| 2011/0142041 A1 * | 6/2011 | Imai | H04L 45/124 370/389 |
| 2011/0185422 A1 * | 7/2011 | Khayam | H04L 63/1425 726/23 |
| 2011/0225653 A1 * | 9/2011 | Maeda | G06F 21/57 726/22 |
| 2011/0320388 A1 | 12/2011 | Wong et al. | |
| 2013/0185415 A1 * | 7/2013 | Schnier | G06F 9/505 709/224 |
| 2013/0254524 A1 * | 9/2013 | Snapir | G06F 9/44505 713/100 |

OTHER PUBLICATIONS

Supplementary European Search Report, European Patent Application No. 12877746.3, dated Jan. 25, 2016, 7 pages.

\* cited by examiner

PARAMETER ADJUSTMENT FOR PATTERN DISCOVERY

CROSS-REFERENCE TO RELATED APPLICATION

This application is a national stage application under 35 U.S.C. § 371 of PCT/US2012/040022, filed May 30, 2012.

BACKGROUND

Pattern detection generally aims to find previously unknown patterns in an input dataset. A pattern is an association of elements of the dataset that repeat throughout the duration of an examination time period. This is opposed to pattern matching methodologies, which look for matches in the input with pre-existing patterns, for example, using regular expressions.

Pattern detection methodologies require a significant amount of resources, e.g., computational resources and memory. When these resources are scarce or are otherwise unavailable, a pattern detection run may fail to complete analysis on input data.

BRIEF DESCRIPTION OF THE DRAWINGS

The embodiments may be better understood and their features made apparent by referencing the accompanying drawings. The drawings illustrate examples of the embodiments described herein.

DETAILED DESCRIPTION

Figure 1:
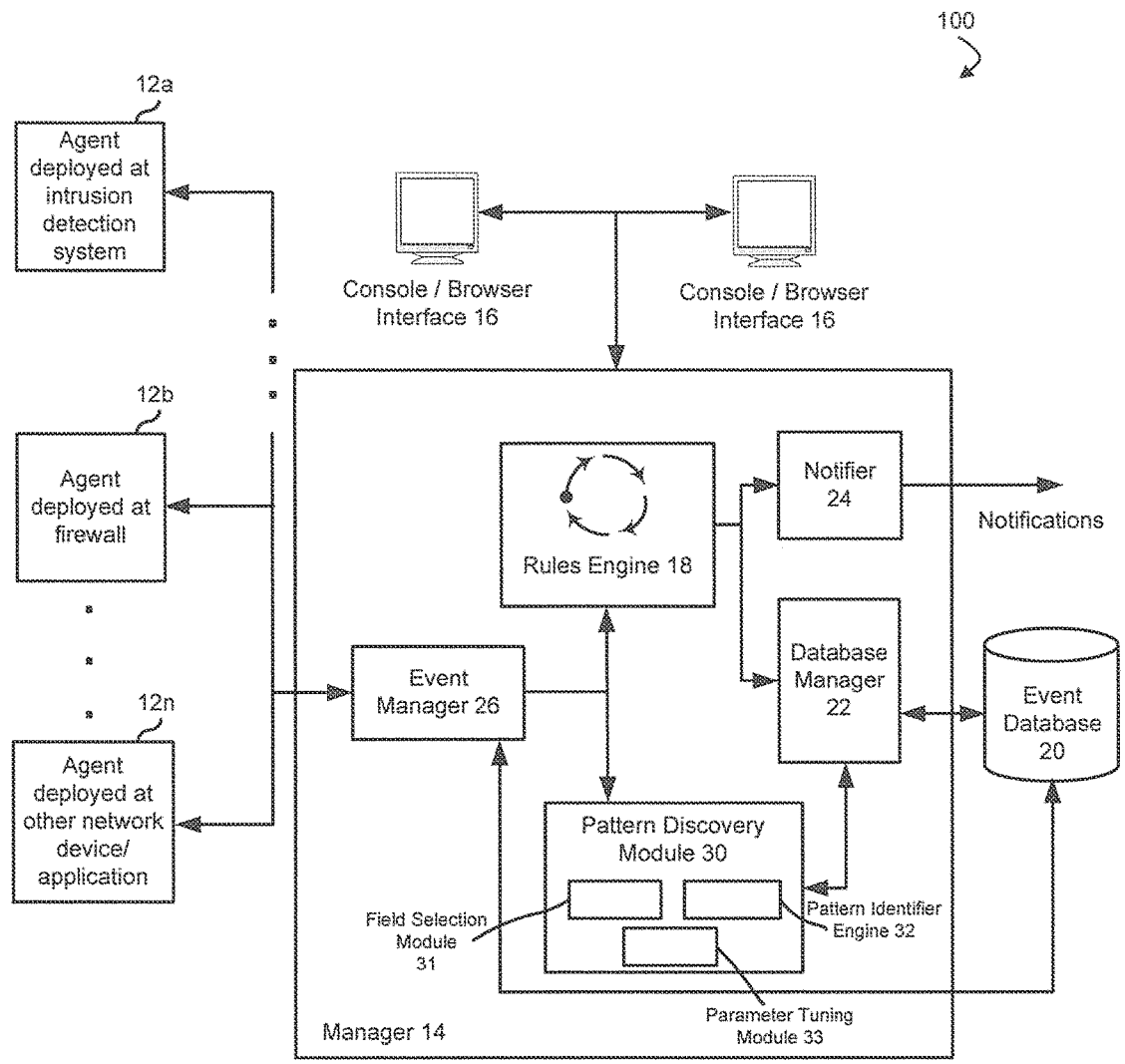
FIG. 1 shows a network security system.

Security information/event management (SIM or SIEM) for networks may include collecting data from networks and network devices that reflects network activity and/or operation of the devices and analyzing the data to enhance security. Examples of network devices may include firewalls, intrusion detection systems, servers, workstations, personal computers, etc. The data can be analyzed to detect patterns, which may be indicative of an attack or anomaly on the network or a network device. The detected patterns may be used, for example, to locate those patterns in the data. For example, the patterns may be indicative of activities of a worm or another type of computer virus trying to gain access to a computer in the network and install malicious software.

The data that is collected from networks and network devices is for events. An event may be any activity that can be monitored and analyzed. Data captured for an event is referred to as event data. The analysis of captured event data may be performed to determine if the event is associated with a threat or some other condition. Examples of activities associated with events may include logins, logouts, sending data over a network, sending emails, accessing applications, reading or writing data, port scanning, installing software, etc. Event data may be collected from messages, log file entries, which is generated by a network device, or from other sources. Security systems may also generate event data, such as correlation events and audit events. In some instances, one thousand events per second may be generated. This can amount to 100 million events per day or three billion events per month.

According to an embodiment, fields and parameters are selected for pattern discovery. Events in event data may have a multitude of attributes. The event data may be stored according to fields associated with the attributes of the events in the event data. A field, for example, is an attribute describing an event in the event data. Examples of fields include date/time of event, event name, event category, event ID, source address, source MAC address, destination address, destination MAC address, user ID, user privileges, device customer string, etc. The event data may be stored in a table comprised of the fields. In some cases, hundreds of fields reflecting different event attributes may be used to store the event data.

For pattern discovery, some of the fields are selected. For example, the selected fields may include a set of the fields from the table. The number of fields in the set may include one or more of the fields from the table. The fields selected for the set may be selected based on various statistics and may be stored in a patter discovery profile. A pattern discovery profile is any data used to discover patterns in event data. The pattern discovery profile may include the set of fields, parameters and other information for pattern discovery.

In addition to including fields, parameters may be used for pattern discovery. The parameters may be included in pattern discovery profiles for pattern discovery. The parameters may specify conditions for the matching of the fields in the pattern discovery profile to event data to detect patterns. Also, the parameters which may be used to adjust the number of patterns detected. One example of a parameter is pattern length which is a number of activities. The pattern length parameter may represent a minimum number of different activities that were performed for the activities to be considered a pattern. Another example of a parameter is a repeatability parameter which may represent a minimum number of times the different activities are repeated for them to be considered a patter. In one example, repeatability is associated with two fields. For example, repeatability may be represented as different combinations of source and target fields across which the activity is repeated. A minimum number of different combinations of source and target IP addresses is an example of a repeatability parameter. These parameters may be adjusted until a predetermined amount of matching patterns is identified.

According to an embodiment, the selection of the parameters is adaptive. For example, the parameters may be adjusted to vary the number of matching patterns that are identified. For example, if system resources, such as memory, CPU cycles, etc., are being exhausted, then a parameter may be adjusted to reduce the number of events that are considered for pattern discovery. In another example, if too little or too many patterns are identified, then the parameters may be adjusted to increase or reduce the number of patterns identified.

A pattern is a sequence of a plurality of different activities. In an example of a pattern, the sequence of activities includes scan ports, identify open port, send packet with particular payload to the port, login to the computer system and store a program in a particular location on the computer system.

Also, patterns that are repeated are identified. For example, if a plurality of different activities is repeated, it may be considered a repetitive pattern. Also, a pattern may be between two computer systems. So the pattern can include a source field and a target field associated with the different computer systems. In one example, the source and target fields are Internet protocol (IP) addresses of the computer systems. The source and target fields describe the transaction between computer systems. Pattern activity may also be grouped together by other fields in addition or in lieu of one of the source and target fields. In one example, the pattern activity may be analyzed across User IDs to identify the sequence or collection of activity repeated by multiple users. In another example, the pattern activity may be analyzed across Credit Card Numbers or Customers to identify the sequence or collection of activity across multiple credit card accounts.

Other event fields, in addition or in lieu of one of the source and target fields may be included in a pattern discovery profile. In one example, a field is used to identify a specific pattern and is referred to as a pattern identification field. In one example, the pattern identification field is event name or event category. In another example, it can be the credit card transaction amount. In yet another another example, it can be an Event Request URL field to detect application URL access patterns.

One simplistic example of a pattern for a virus is as follows. One event is a port scan. Scanning of the port happens on a source machine. The next event is sending a packet to the target machine. The next event can be a login to the target machine. The next event may be a port scan at the target machine and repetition of the other events. In this way, the virus can replicate. By detecting the repeated events as a pattern, the virus may be detected. For example, a selected field for pattern discovery may be event name and the repeatability parameter is 4 and the number of activities parameter is 3. The unique events that are detected have event names of port scan, packet transmission and login on target/destination machine. The number of events is 3. This pattern includes 3 different events (e.g., port scan, packet transmission and login on target/destination machine), which satisfies the number of activities parameter. If this pattern is detected at least 4 times, for example during a pattern discovery run, then it satisfies the repeatability parameter, and it is considered a pattern match. A notification message or another type of alert may be generated.

Multiple pattern discovery profiles may be created to detect a variety of different parameters, If a pattern is detected, actions may be performed. For example if pattern represents an attack on network security, then notifications, alerts or other actions may be performed to stop the attack. Other actions may include displaying the events in the patterns for analysis by a network administrator.

FIG. 1 is a block diagram of a network security system 100 in accordance with an embodiment. System 100 includes agents 12a-n, a manager 14 and a console 16, which may include browser-based versions. In some embodiments, agents, managers and/or consoles may be combined in a single platform or distributed in two, three or more platforms (such as in the illustrated example). The use of this multi-tier architecture supports scalability as a computer network or system grows.

Agents 12a-n comprise machine readable instructions that provide efficient, real-time (or near real-time) local event data capture and filtering from a variety of network security devices and/or applications. The typical sources of security events are common network security devices, such as firewalls, intrusion detection systems and operating system logs. Agents 12a-n collect events from any source that produces event logs or messages and can operate at the native device, at consolidation points within the network, and/or through simple network management protocol (SNMP) traps.

Agents 12a-n are configurable through both manual and automated processes and via associated configuration files. Each agent 12 may include a normalizing component, a time correction component, an aggregation component, a batching component, a resolver component, a transport component, and/or additional components. These components may be activated and/or deactivated through appropriate commands in the configuration file.

Manager 14 may be comprised of server-based components that further consolidate, filter and cross-correlate events received from the agents, employing a rules engine 18 and a centralized event database 20 which may include an event table comprised of fields storing event data for received events. The database 20 may also store pattern discovery profiles generated by the manager 14. One role of manager 14 is to capture and store all of the real-time and historic event data to construct (via database manager 22) a complete, picture of security activity. The manager 14 also provides centralized administration, notification (through at least one notifier 24), and reporting, and case management workflow. The manager 14 may be deployed on any computer hardware platform and may use a database management system to implement the event data store component. Communications between manager 14 and agents 12a-n may be bi-directional (e.g., to allow manager 14 to transmit commands to the platform hosting agents 12a-n) and encrypted. Manager 14 may act as concentrators for multiple agents 12a-n and can forward information to other managers, e.g., deployed at a corporate headquarters.

Manager 14 also includes event manager 26, which receives the event data messages transmitted by agents 12a-n. Event manager 26 is also responsible for generating event data messages such as correlation events and audit events. Where bi-directional communication with agents 12a-n is implemented, event manager 26 may be used to transmit messages to agents 12a-n. If encryption is employed for agent-manager communications, event manager 26 is responsible for decrypting the messages received from agents 12a-n and encrypting any messages transmitted to agents 12a-n.

Consoles 16 are applications that allow security professionals to perform day-to-day administrative and operation tasks such as event monitoring, rules authoring, incident investigation and reporting. Access control lists allow multiple security professionals to use the same system and event/trend database, with each having their own views, correlation rules, alerts, reports and knowledge base appropriate to their responsibilities. A single manager 14 can support multiple consoles 16.

Consoles 16 may be browser-based, and may be used to provide access to security events, knowledge base articles, reports, notifications and cases. The manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture, a centralized or decentralized environment may be supported. This is useful because an organization may want to implement a single instance of system 100 and use an access control list to partition users. Alternatively, the organization may choose to deploy separate systems 100 for each of a number of groups and consolidate the results at a "master" level.

The network security system 100 also includes pattern processing capabilities. The manager 14 includes a pattern discovery module 30. The pattern discovery module 30 receives a set of events, such as events from at least one of agents 12*a-n* via event manager 26, from event database 20 via the database manager 22, or from event manager 26.

In operation, agents 12*a-n* may provide events and/or aggregated data. In one example, agents 12*a-n* provide events, which are received in an event stream by event manager 26 and passed to rules engine 18 and pattern discovery module 30 for processing. An event stream is a continuous flow of events. Event data received from agents 12*a-n* or generated by manager 14 may be stored in an event table of database 20 via database manager 22.

The pattern discovery module 30 generates pattern discovery profiles which may be stored in the event database 20. A pattern discovery profile may include selected fields and parameters for identifying patterns in event data. The methods described below describe adjusting parameters which may be used in pattern discovery profiles. The pattern discovery profiles are used to detect a plurality of events in the event database 20, which satisfy the criteria described in the pattern discovery profiles. The events selected for comparison to the criteria defined in the pattern discovery profiles may be based on a range or a category that may be specified by the user or another process. The range for example may include a time range for events, such as the events within the last 5 minutes, or within the last 24 hours. Other filter conditions, specified by the parameters, may be applied to identify the set of events to compare against pattern discovery profiles. The database manager 22 may execute SQL commands to compare event data from the event database 20 to the criteria defined in the pattern discovery profiles.

The pattern discovery module 30 may also adjust parameters based on the output of pattern discovery runs. A pattern discovery run is the process of analyzing event data to determine if the event data has patterns that satisfy the criteria specified by the fields and parameters which may be specified in a pattern discovery profile. The analyzing of event data may include determining whether events in the event data satisfy conditions specified by the parameters that are associated with the fields in the pattern discovery profile. The pattern discovery module 30 may include a field selection module 31 to select fields for a pattern discovery profile and a pattern identifier engine 32 for detecting patterns that satisfy the criteria of a pattern discovery profile. The pattern discovery module 30 may also include a parameter tuning module 33 for adjusting parameters. The field selection module 31, the pattern identifier engine 32 and the parameter tuning module 33 are described in further detail with respect to FIG. 2.

The notifier 24 may generate notifications (e.g., messages, alerts, etc., if a pattern is detected. Also, event data for detected patterns may be displayed and analyzed. The rules engine 18 may include rules for invoking pattern detection via the database manager 22, such as rules describing when to conduct pattern detection or who can view pattern detection results.

Figure 2:
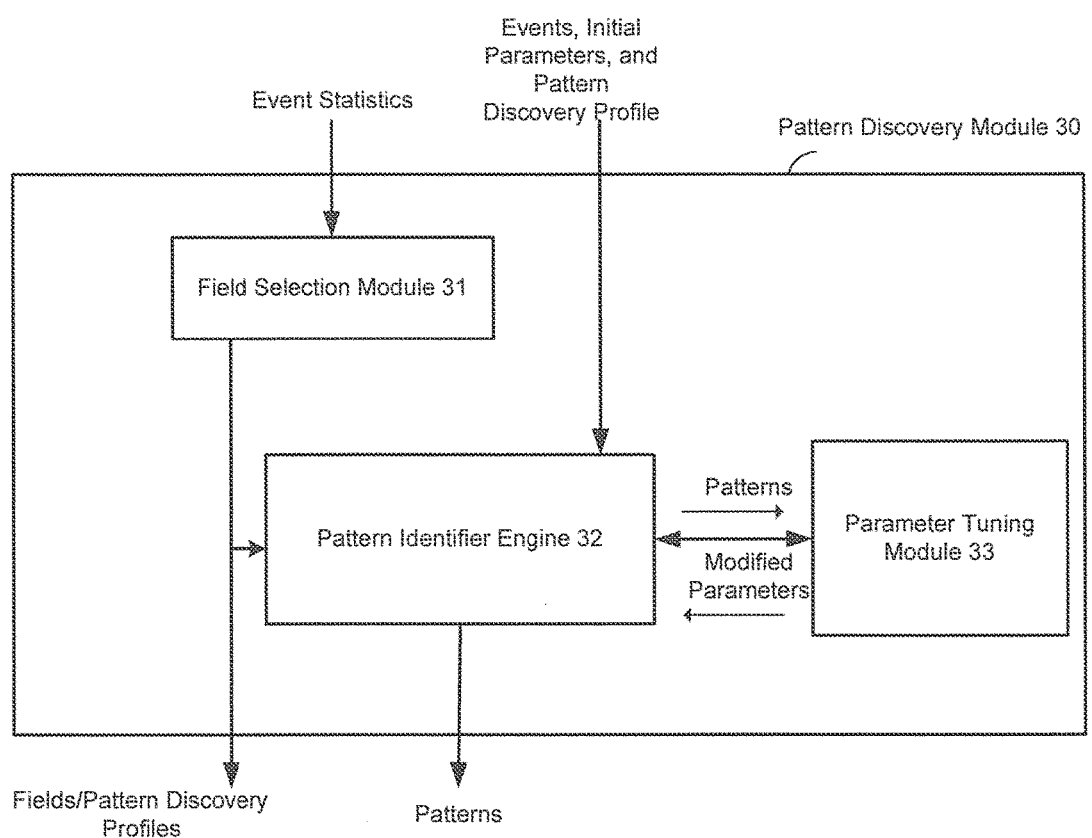
FIG. 2 shows a pattern discovery module.

FIG. 2 shows the pattern discovery module 30 including the field selection module 31, the pattern identifier engine 32, and the parameter tuning module 33. The field selection module 31 analyzes event statistics to select fields for pattern discovery profiles. The event statistics may include the cardinality and repetitiveness for various fields in the database. Cardinality is the number of unique items in a set. Fields with a higher cardinality may become the transaction field for binding transactions comprised of a sequence of activities.

Repetitiveness is the number of times a value in a field is repeated. A field with high cardinality may help achieve high repetitiveness. For example, assume there are only two computer systems in a network, and only these computer systems are reporting activity as events. There are only two IP address, so if the source IP address or the target IP address are selected as the transaction fields, there is not much repetitive behavior. However, if there are ten different sets of computer systems, then more repetitiveness for a sequence of activities may be detected because there are many more combinations of source and target IP addresses that can exhibit the sequence of activities.

The pattern identifier engine 32 executes pattern discovery runs to compare events to the criteria defined in the pattern discovery profiles to identify patterns matching the pattern discovery profiles. For example, the pattern identifier engine 32 may receive a pattern discovery profile from the field selection module 31 or receive a previously-stored pattern discovery profile from the event database 20. A match may include events representing a sequence of activities that meet the criteria of the fields and parameters specified in the pattern discovery profile. Each instance that matches the pattern discovery profile is a pattern.

Prior to comparing events to a pattern discovery profile, the events may be filtered. For example, events matching predetermined criteria, such as events within a range or in a category, may be received from the event database 20 in response to a query. These events are compared to the criteria defined in discovery profile during the pattern discovery run to detect matches.

The parameter tuning module 33 adjusts parameters based on the output of a pattern discovery run. For example, the output of a pattern discovery run may include patterns that are identified that match the pattern discovery profile. If the number of patterns that are identified is not as desired by a user or by the system itself, such as too few or too many, then one or more parameters in the pattern discovery profile may be adjusted so the desired number of patterns is identified. Examples of adjusting the parameters are described below.

Figure 3:
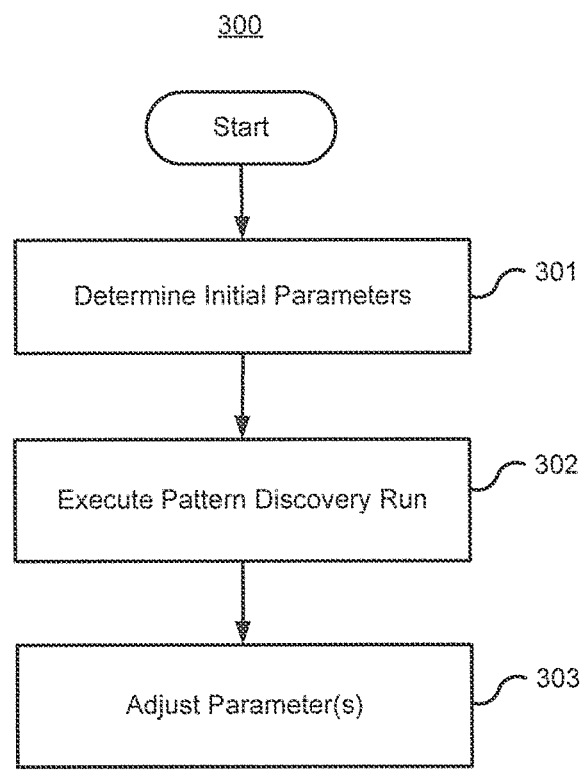
FIG. 3 shows a flow diagram for parameter selection.

FIG. 3 illustrates an example of a method 300 for adjusting parameters for pattern discovery. The parameters and fields may be selected and incorporated into a pattern discovery profile and stored in the event database 20 shown in FIG. 1. The method 300 may be performed by the pattern discovery module 30 or by other modules in systems other than shown in FIG. 1. Also, the method 300 may be carried out by execution of machine readable instructions stored on a data storage device.

At 301, initial parameters for pattern discovery are determined. Examples of parameters may include a length of a pattern, which may identify a minimum and/or maximum number of different activities (e.g., events) that need to be performed for the activities to be considered a pattern, a repeatability parameter which indicates a minimum and/or maximum number of times the different activities are repeated (may include repetitiveness of a pattern sequence across multiple source and destination combinations), time duration, which is the duration of time for events that are considering for pattern matching (e.g., 15 minutes, 1 hour, half day, 2 days, etc.), minimum and/or maximum time from first event to last event in the pattern (e.g., time elapsed on the pattern), etc.

The initial parameters that are determined may include a selection of one or more of the parameters and their values. In one example, the initial parameters are determined by analyzing parameters used in previous runs of pattern discovery and analyzing the pattern matching results of the runs. A user may select the initial parameters and their values.

The parameters may be associated with conditions for identifying patterns from event data and may be associated with fields selected for identifying the patterns. For example, if event name is a selected field, and length of pattern is an initial parameter, then a pattern is identified from event data if it comprises a set of events having different event names and the number of different event names is at least as large as the pattern length parameter.

Fields may be selected for the pattern discovery run. In one example, the fields are predetermined. In another example, the fields are identified based on statistics for each field. Cardinality and repetitiveness are examples of statistics that may be used to select the fields. The cardinality of a field is the number of unique items (e.g., values) in the field. The repetitiveness of a field is the number of times a value in the field is repeated. For example, the field may be event name and the repetitiveness of this field determines the number of times each unique event name in the field is repeated. The event name may be describing the activity for the event and the repetitiveness may identify the number of times each activity is repeated. Some fields may have null values and the null values are not included when determining the cardinality and repetitiveness of each field. The cardinality and repetitiveness statistics for a field may be determined by querying the event database 20.

At 302, a pattern discovery run is executed on event data based on the initial parameters. The pattern discovery run may include analyzing event data to determine whether it satisfies the conditions specified by the fields and initial parameters in a discovery profile. The output of the pattern discovery run may include the result set of patterns that satisfy the conditions. The result set may include no patterns, one pattern or multiple patterns. In some cases, the pattern discovery run may fail, and then the result set is zero or null. Failure of the pattern discovery run may include the pattern discovery run failing to complete execution within a predetermined period of time. In some cases, the failure may be caused by lack of resources to execute the run.

At 303, a parameter from the initial parameters may be adjusted based on the output of the pattern discovery run. The output may include the result set of patterns. The output may be analyzed to determine whether the result set satisfies one or more thresholds and/or whether the pattern discovery run completed. For example, the number of patterns in the result set may be compared to a maximum and/or minimum threshold. If too many patterns are in the result set (e.g., number of patterns in the result set exceeds the maximum threshold) then the parameters may be adjusted to generate less matches. For example, the repeatability parameter is increased, or the pattern length parameter is increased, or the time duration is shortened. If too little patterns are in the result set (e.g., number of patterns in the result set is less than the minimum threshold) then the parameters may be adjusted to generate more matches. For example, the repeatability parameter is decreased, or the patter length parameter is decreased, or the time duration is increased. Also, if the pattern discovery run failed or if execution of the pattern discovery run is exceeding a predetermined length of time, then no result set may be generated and the parameters may be adjusted to reduce system resources to run the pattern discovery.

The result set may be within a range of desired patterns to be identified from the pattern discovery run. In these cases, the parameters may not be adjusted. Alternatively, parameters and fields are modified to determine new discovery profiles to identify different patterns.

If one or more parameters are adjusted, the discovery run such as performed at 302 may be repeated but with the adjusted parameters and also with parameters that were not adjusted. Then, the output is analyzed again and parameters may be adjusted again until a desired result set of patterns are identified.

Figure 4:
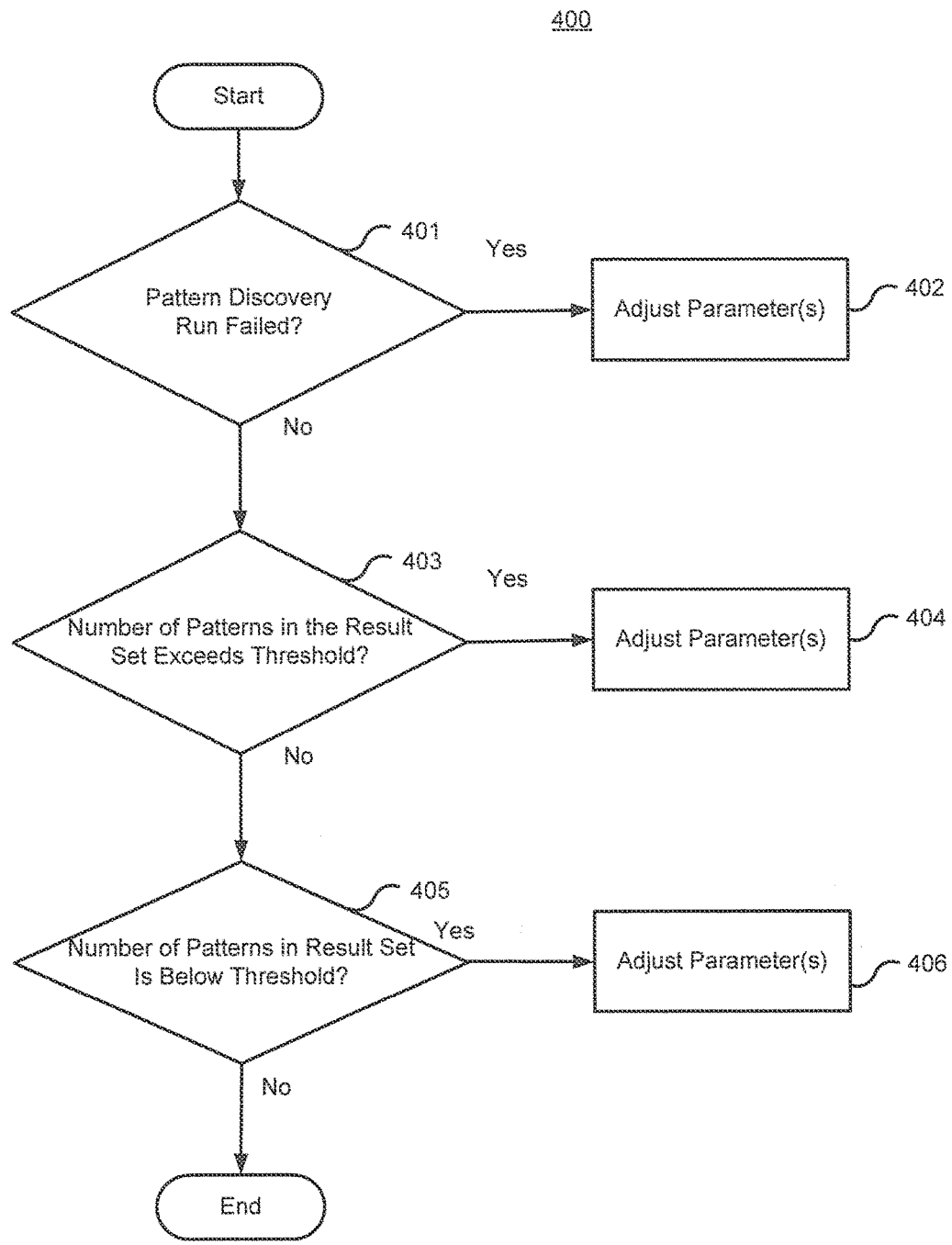
FIG. 4 shows another flow diagram showing additional details for parameter selection.

FIG. 4 illustrates an example of a method 400 for adjusting parameters for patter discovery. The method 400 may be performed for 303 shown in FIG. 3. The method 400 may be performed by the pattern discovery module 30 or by other modules in systems other than shown in FIG. 1. Also, the method 400 may be carried out by execution of machine readable instructions stored on a data storage device.

At 401, a determination is made as to whether the pattern discovery run failed. Failure may include failing to complete within a predetermined period of time. If the pattern discovery run failed, a parameter may be adjusted at 402 to reduce the system resources to execute a subsequent pattern discovery run. For example, a parameter may be adjusted to reduce the number of different combinations of different events that are to be considered for determining whether a sequence of events is a pattern. In one example, the time duration parameter is reduced so the total number of events that are analyzed for pattern detection is reduced.

At 403, a determination is made as to whether the number of patterns identified from the pattern discovery run exceeds a threshold (e.g., too many patterns are detected). This threshold is a maximum threshold and may be set by a user and may be based on one or more factors, such as the user's capacity to review all the patterns, time it takes to execute the pattern discovery run, etc. If the patterns exceeds the maximum threshold, then at 404 one or more of the parameters are adjusted. For example, parameters are restricted to reduce the number of discovered patterns. For example, a minimum repeatability value is increased, a minimum pattern length value is increased, the time duration of events that are considered is shortened, etc.

At 405, a determination is made as to whether the number of patterns is below a threshold. This threshold is a minimum threshold and may be set by a user. If the number of patterns is below the minimum threshold, then at 406 one or more of the parameters are expanded. The parameters are expanded to increase the number of discovered patterns. For example, a minimum repeatability value is decreased, a minimum pattern length value is decreased, the time duration of events that are considered is increased, etc.

401, 403 and 405 may be performed in a different order than shown in FIG. 4.

Figure 5:
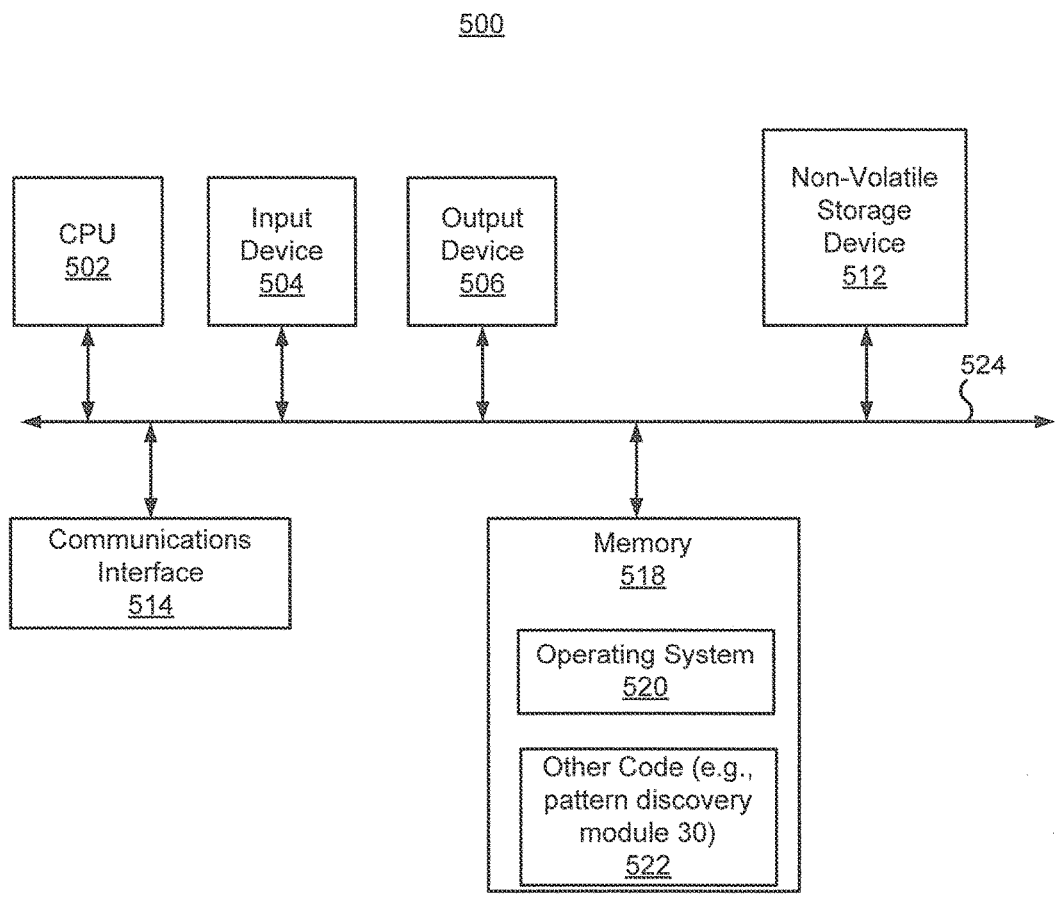
FIG. 5 shows a computer system in which embodiments may be implemented.

FIG. 5 illustrates a computer system in which an embodiment may be implemented. The computer system 500 may be a platform for the system 100 shown in FIG. 1 or one or more of the components of the system 100. The computer system 500 is shown comprising hardware elements that may be electrically coupled via a bus 524. The hardware elements may include a processor, such as central processing unit (CPU) 502, an input device 504, and an output device 505. The computer system 500 may also include storage devices, such as memory 518 and non-volatile storage device 512 (e.g., hard disks, optical disk, solid state storage, etc.). The storage devices are examples of non-transitory computer readable media that may store machine readable instructions. For example, at runtime, the memory 518 may store an operating system 520 and other code 522. The other code 522 may include modules from the system 100 shown in FIG. 1, such as the pattern discovery module 30. The non-volatile storage device 512 may store data and machine readable instructions. The computer system 500 may additionally include a communications interface 514 (e.g., a modem, a network card (wireless or wired), an infra-red communication device, etc.).

It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

While the embodiments have been described with reference to examples, various modifications to the described embodiments may be made without departing from the scope of the embodiments.

What is claimed is:

1. A method comprising:
   receiving event data collected by agents from sources over a communication network, the sources comprising network security devices;
   providing a set of parameters to a pattern identifier engine, wherein the set of parameters specify conditions for identifying patterns in the event data;
   executing, by the pattern identifier engine executed on a hardware processor of a manager system, a pattern discovery comprising identifying, by the pattern identifier engine, the patterns in the event data if the event data satisfies the conditions specified by the set of parameters;
   determining whether the pattern discovery failed to complete within a predetermined period of time;
   in response to determining that the pattern discovery failed to complete within the predetermined period of time, iteratively performing further pattern discovery until a criterion is satisfied by:
      adjusting a parameter of the set of parameters to reduce use of system resources of the manager system for a subsequent pattern discovery run, the adjusting producing a respective adjusted set of parameters;
      providing the respective adjusted set of parameters to the pattern identifier engine and executing, by the pattern identifier engine, the subsequent pattern discovery run to identify patterns in the event data if the event data satisfies conditions specified by the respective adjusted set of parameters; and
   executing an action in response to the identified patterns produced by the further pattern discovery, the action comprising one or more of mitigating an attack and displaying the event data for analysis by a network administrator.

2. The method of claim 1, wherein the set of parameters comprises at least one of: a pattern length parameter that identifies a minimum number of different activities that are performed in a sequence for the activities to be considered a pattern, a repeatability parameter that identifies a minimum number of times the different activities are repeated to be considered a pattern, or a time duration parameter that identifies a time duration of the event data that is considered for the pattern discovery.

3. The method of claim 2, comprising:
   determining whether a number of the patterns identified from the event data as a result of executing the pattern discovery is less than a threshold; and
   in response to determining that the number of the patterns identified from the event data is less than the threshold, adjusting the parameter to increase the number of the patterns identified from the event data.

4. The method of claim 3, wherein adjusting the parameter comprises at least one of:
   increasing the pattern length parameter, increasing the repeatability parameter, or decreasing the time duration parameter.

5. The method of claim 2, comprising:
   determining whether a number of the patterns identified from the event data as a result of executing the pattern discovery is greater than a threshold; and
   in response to determining that the number of the patterns identified from the event data is greater than the threshold, adjusting the parameter to decrease the number of the patterns identified from the event data.

6. The method of claim 5, wherein adjusting the parameter comprises at least one of:
   decreasing the pattern length parameter, decreasing the repeatability parameter, or increasing the time duration parameter.

7. The method of claim 1, comprising:
   selecting a set of fields based on field statistics;
   including the set of fields and the set of parameters in a pattern discovery profile; and
   executing the pattern discovery based on the pattern discovery profile.

8. The method of claim 7, wherein executing the pattern discovery comprises:
   determining whether the event data includes the set of fields that satisfy the conditions specified by the set of parameters to identify the patterns in the event data matching the pattern discovery profile.

9. The method of claim 1, wherein an output of the pattern discovery comprises a result set of the patterns satisfying the conditions that are specified by the set of parameters, wherein the conditions are associated with a set of fields for the event data.

10. The method of claim 1, further comprising:
    identifying presence of a malicious program based on the patterns in the event data identified by the further pattern discovery.

11. A network security event processing system comprising:
    a hardware processor; and
    a non-transitory storage medium storing instructions executable on the hardware processor to:
       receive event data collected by agents from sources over a communication network, the sources comprising network security devices;
       execute, by a pattern identifier engine, a pattern discovery run to detect patterns in the event data based on a set of parameters that specify conditions for identifying the patterns, wherein the patterns are detected if the event data satisfies the conditions specified by the set of parameters, the event data describing activities for devices connected to the communication network;

determine whether the pattern discovery run failed to complete within a predetermined period of time;

in response to determining that the pattern discovery run failed to complete within the predetermined period of time, iteratively perform further pattern discovery until a criterion is satisfied by:

adjusting a parameter from the set of parameters to reduce use of system resources of the network security event processing system for a subsequent pattern discovery run, the adjusting producing an adjusted set of parameters;

providing the adjusted set of parameters to the pattern identifier engine and execute, by the pattern identifier engine, the subsequent pattern discovery run to identify patterns in the event data if the event data satisfies conditions specified by the adjusted set of parameters; and execute an action in response to the identified patterns produced by the further pattern discovery, the action comprising one or more of mitigating an attack and displaying the event data for analysis by a network administrator.

12. The network security event processing system of claim 11, wherein the instructions are executable on the hardware processor to:

determine whether a number of the patterns identified from the event data as a result of executing the pattern discovery run is less than a threshold; and in response to determining that the number of the patterns identified from the event data is less than the threshold, adjust the parameter to increase the number of the patterns identified from the event data.

13. The network security event processing system of claim 11, wherein the instructions are executable on the hardware processor to:

determine whether a number of the patterns identified from the event data as a result of executing the pattern discovery run is greater than a threshold; and in response to determining that the number of the patterns identified from the event data is greater than the threshold, adjust the parameter to decrease the number of the patterns identified from the event data.

14. The network security event processing system of claim 11, wherein the instructions are executable on the hardware processor to:

identify presence of a virus or worm based on the patterns in the event data identified by the further pattern discovery.

15. A non-transitory computer readable medium including machine readable instructions that when executed cause a manager system to:

receive event data collected by agents from sources over a communication network, the sources comprising network security devices;

provide a set of parameters to a pattern identifier engine, wherein the set of parameters specify conditions for identifying patterns in the event data;

execute, by the pattern identifier engine, a pattern discovery comprising identifying the patterns in the event data if the event data satisfies the conditions specified by the set of parameters;

determine whether the pattern discovery failed to complete within a predetermined period of time;

in response to determining that the pattern discovery failed to complete within the predetermined period of time, iteratively perform further pattern discovery until a criterion is satisfied by:

adjusting a parameter of the initial set of parameters to reduce use of system resources of the manager system for a subsequent pattern discovery run, the adjusting producing an adjusted set of parameters; and providing the adjusted set of parameters to the pattern identifier engine and execute, by the pattern identifier engine, the subsequent pattern discovery run to identify patterns in the event data if the event data satisfies conditions specified by the adjusted set of parameters; and execute an action in response to the identified patterns produced by the further pattern discovery, the action comprising one or more of mitigating an attack and displaying the event data for analysis by a network administrator.

16. The non-transitory computer readable medium of claim 15, wherein the instructions when executed cause the manager system to:

determine whether a number of the patterns identified from the event data as result of executing the pattern discovery is less than a threshold; and in response to determining that the number of the patterns identified from the event data is less than the threshold, adjust the parameter to increase the number of the patterns identified from the event data.

17. The non-transitory computer readable medium of claim 15, wherein the instructions when executed cause the manager system to:

determine whether a number of the patterns identified from the event data as result of executing the pattern discovery is greater than a threshold; and in response to determining that the number of the patterns identified from the event data is greater than the threshold, adjust the parameter to decrease the number of the patterns identified from the event data.

18. The non-transitory computer readable medium of claim 15, wherein the instructions when executed cause the system to:

identify presence of a virus or worm based on the patterns in the event data identified by the further pattern discovery.

* * * * *